United States Patent [19]

Takeuchi

[11] Patent Number: 4,860,538
[45] Date of Patent: Aug. 29, 1989

[54] EXHAUST GAS CONTROL MEANS FOR MOTORCYCLE AND THE LIKE

[75] Inventor: Yoshikiho Takeuchi, Iwata, Japan

[73] Assignee: Yamaha Hatsudoki Kabushiki Kaisha, Iwata, Japan

[21] Appl. No.: 159,174

[22] Filed: Feb. 23, 1988

[51] Int. Cl.⁴ ............................................. F02B 27/02
[52] U.S. Cl. ....................................... 60/313; 60/312; 180/219
[58] Field of Search .................. 60/312, 313; 180/219

[56] References Cited

U.S. PATENT DOCUMENTS

| | | |
|---|---|---|
| 933,906 | 9/1909 | Illy . |
| 1,411,226 | 3/1922 | Stumpf . |
| 2,230,740 | 10/1939 | Birkigt . |
| 2,239,262 | 4/1941 | Violet . |
| 2,305,946 | 12/1942 | Wilson . |
| 2,627,851 | 2/1950 | Cushman . |
| 2,644,436 | 10/1950 | Berlyn . |
| 2,686,398 | 10/1952 | Anderson . |
| 2,717,583 | 9/1955 | Maybach . |
| 3,523,418 | 8/1970 | Marsee . |
| 3,751,921 | 8/1973 | Blomberg . |
| 3,817,227 | 6/1974 | Onishi . |
| 3,938,330 | 2/1976 | Nakajima . |
| 3,969,895 | 6/1976 | Krizman . |
| 4,051,821 | 10/1977 | Amann . |
| 4,254,752 | 3/1981 | Friddell . |
| 4,359,865 | 11/1982 | Nakao ................... 60/313 |
| 4,522,029 | 6/1985 | Tomita . |
| 4,539,813 | 9/1985 | Tomita . |
| 4,545,200 | 10/1985 | Oike . |
| 4,554,785 | 11/1985 | Oike . |
| 4,558,566 | 12/1985 | Shirakura . |
| 4,673,052 | 6/1987 | Shinozake ............. 60/313 |
| 4,765,137 | 8/1988 | Sakurai ................. 60/313 |
| 4,785,626 | 11/1988 | Shiraishi ............... 60/313 |

FOREIGN PATENT DOCUMENTS 1010779 6/1957 Fed. Rep. of Germany ........ 60/313

Primary Examiner—Douglas Hart
Attorney, Agent, or Firm—Ernest A. Beutler

[57] ABSTRACT

Several embodiments of motorcycle exhaust systems having forward and rearward exhaust pipes at least one of which extends transversely in a transversely extending expansion chamber for improving high speed performance. In addition, a variety of control valves are incorporated for varying the reflective area of the exhaust pipe ends so as to improve low speed and midrange performance.

29 Claims, 14 Drawing Sheets

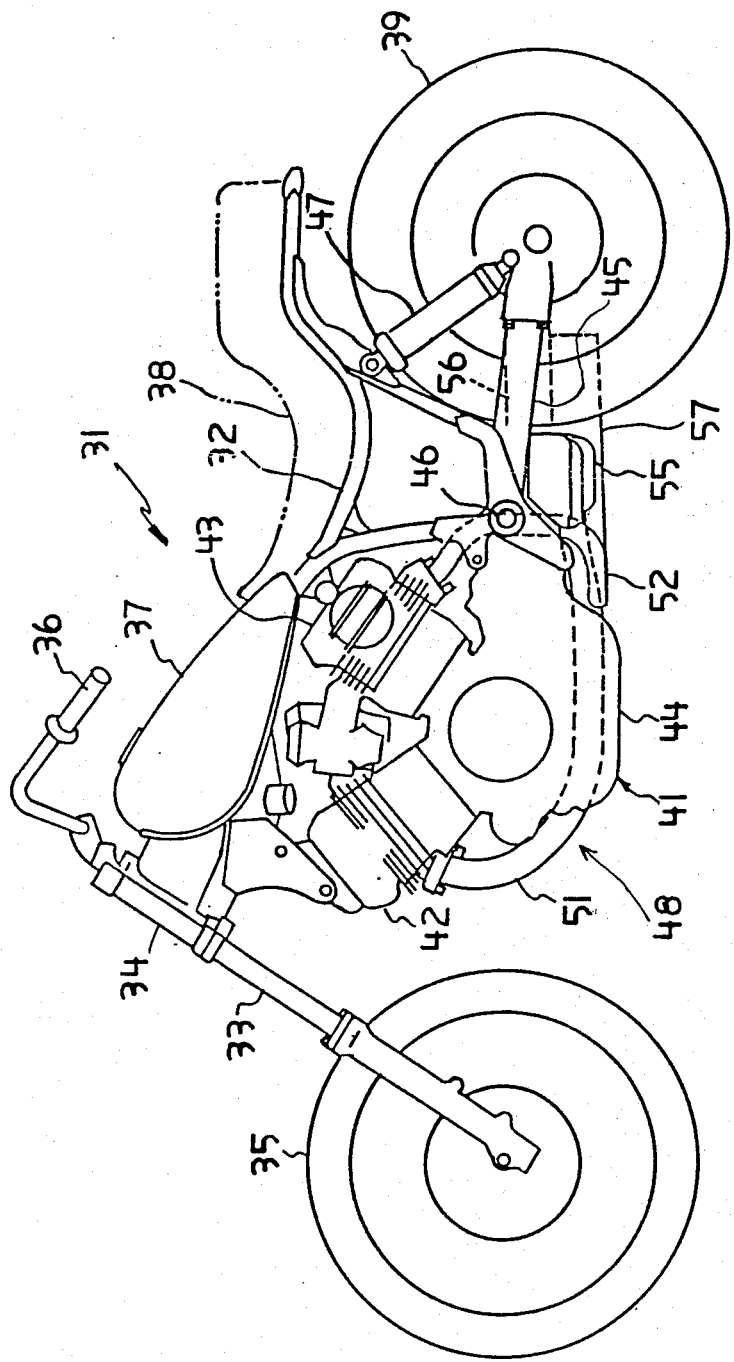
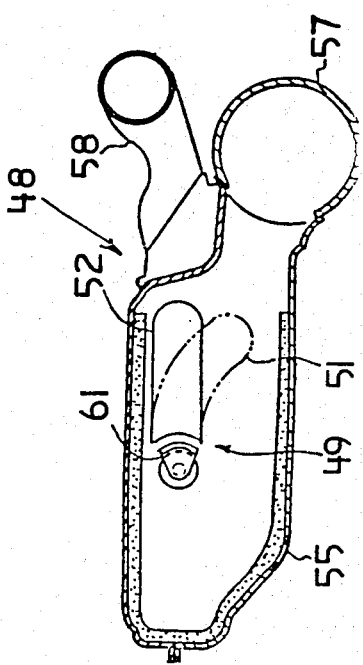
FIGURE 1
FIGURE 3

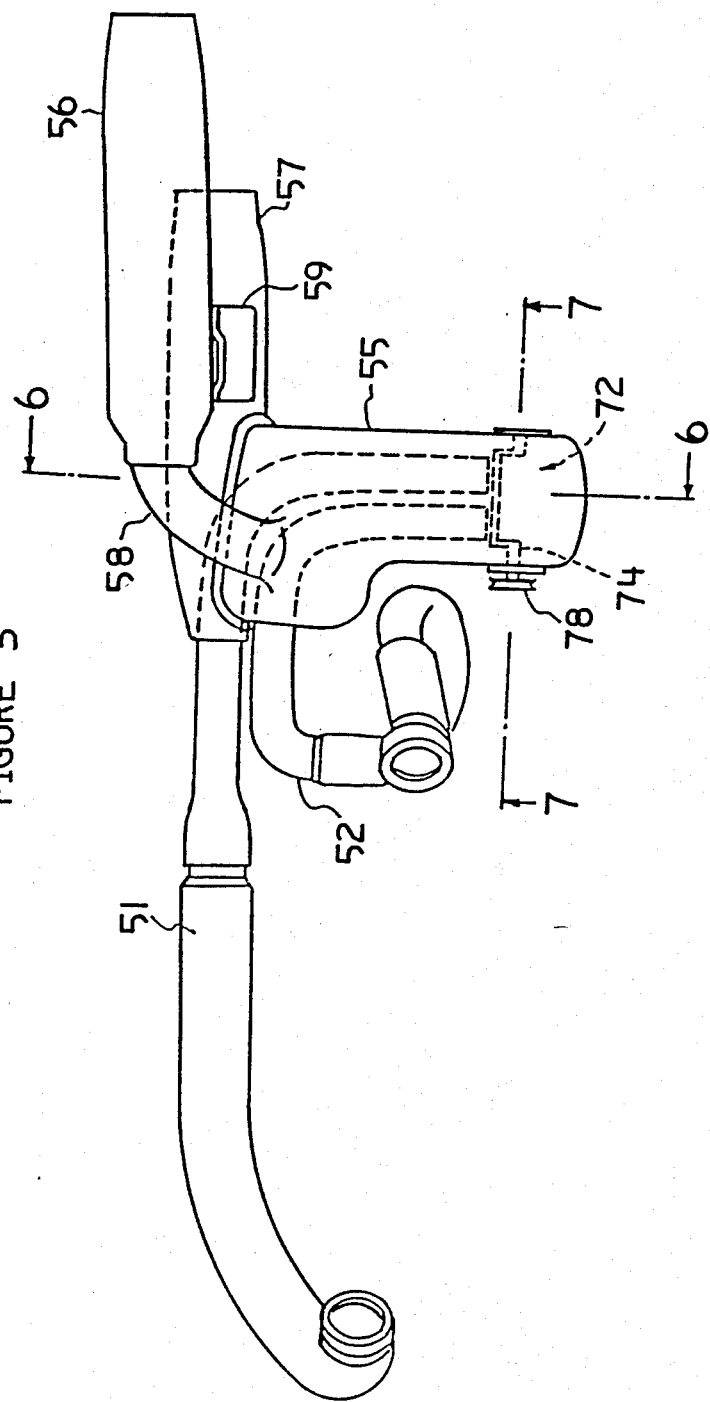
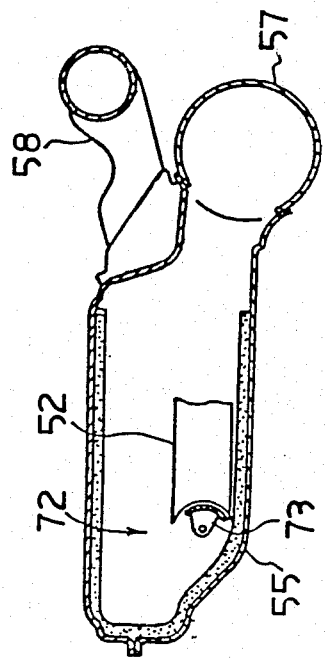
FIGURE 5
FIGURE 6

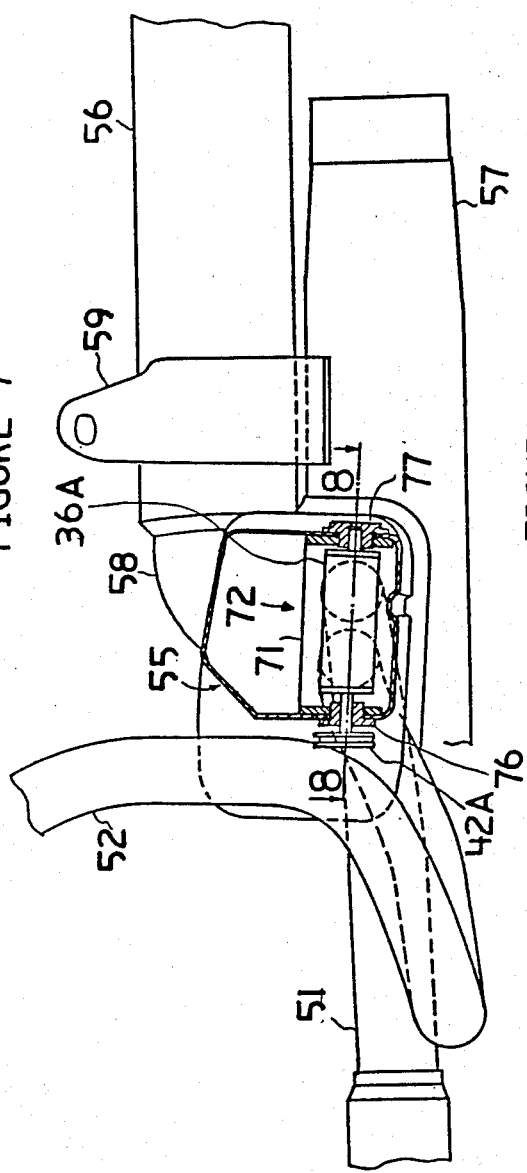
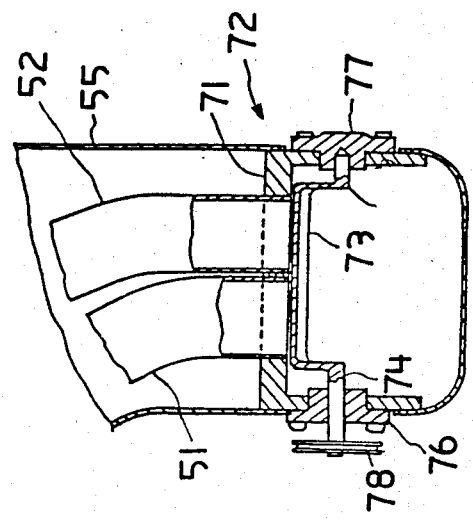

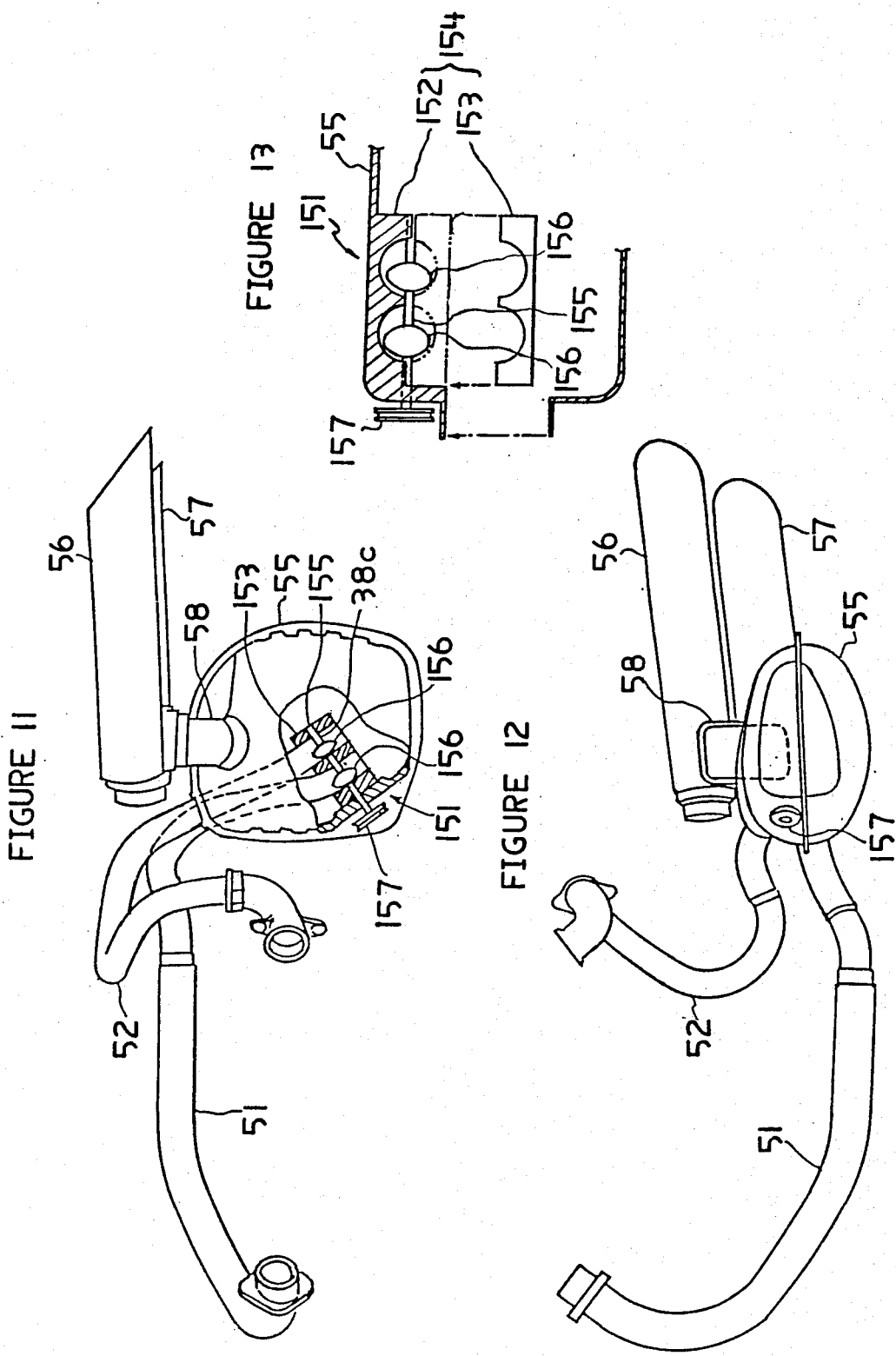

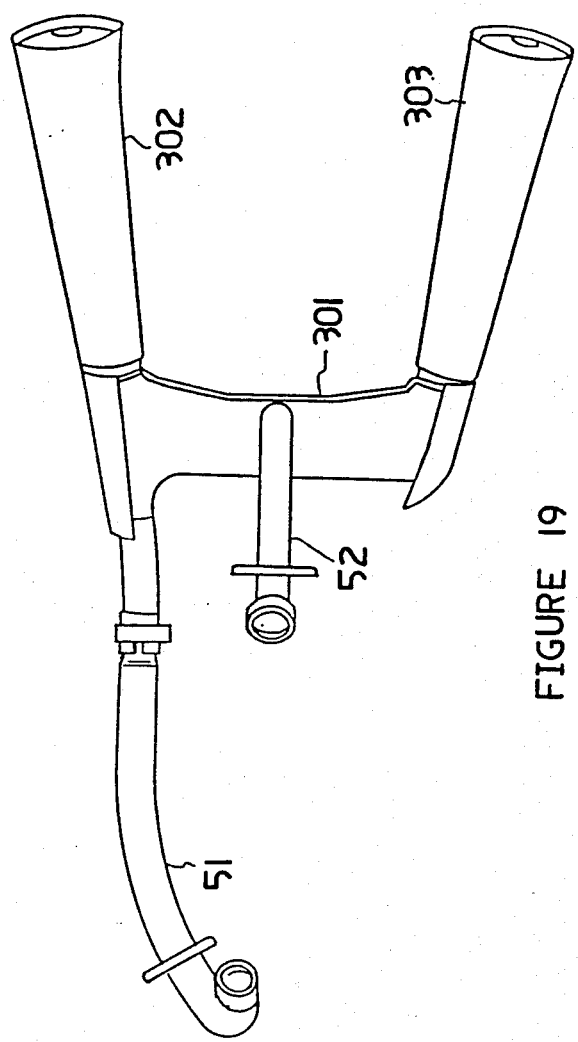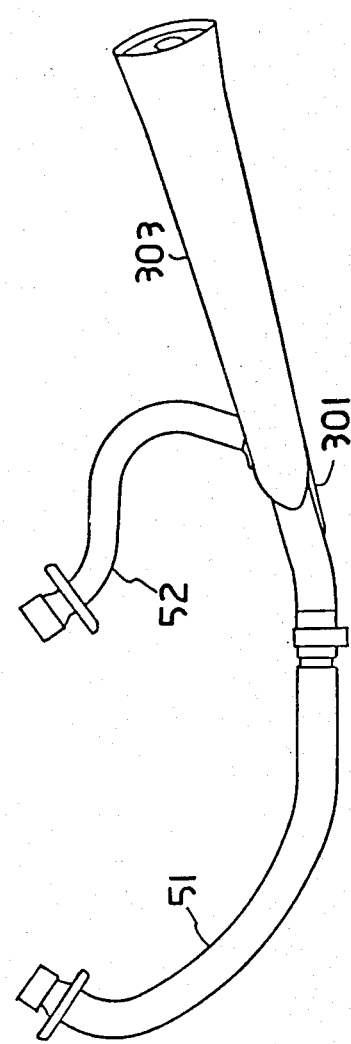
FIGURE 18
FIGURE 19

EXHAUST GAS CONTROL MEANS FOR MOTORCYCLE AND THE LIKE

BACKGROUND OF THE INVENTION

This invention relates to an exhaust gas control means for a motorcycle and the like and more particularly to an improved arrangement for controlling the exhaust gases of an internal combustion engine and for arranging the exhaust components in a motorcycle.

It is well known that the tuning of an exhaust system for an internal combustion engine is particularly important in determining the performance of the engine. It has been found that the performance of the engine can be improved significantly if the exhaust pipe which conveys the exhaust gases from the engine exhaust port terminates within an expansion chamber. Although such an arrangement can increase the output of an engine at high speeds, such combined exhaust pipe and expansion chamber sytems can offer certain disadvantage under other running conditions. This is particularly true when multiple exhaust pipes from different cylinders discharge into the same expansion chamber.

It has been found that resonant pulses will occur in the exhaust pipes which may be transmitted from one exhaust pipe back into another which can adversely affect the performance at mid-range. In order to obviate these difficulties, it has been proposed to provide a reflective control valve at the termination of the exhaust pipe which control valve is positioned in response to engine running characteristics. The exhaust control valve can create reflective pulses that will overcome the deleterious effects aforenoted. The copending applications "High Performance Exhaust System For Internal Combustion Engine", Ser. Nos. 935,340 and 934,342, filed Nov. 26, 1986 in the name of Hideaki Ueda and assigned to the assignee of this application, disclose arrangements wherein this principle is described and the disclosure of these applications is incorporated herein by reference.

Although the arrangements disclosed in the aforenoted copending applications will overcome the performance difficulties discussed above, further improvement is possible. Specifically, the arrangements shown in the aforenoted copending applications position the control valves at the point where the exhaust pipes enter the expansion chamber. Although such an arrangement has utility in connection with certain engines and applications, the tuning of the length of the exhaust pipe and its relationship to the expansion chamber can be particularly important. In some instances, it is desirable to have the exhaust pipe extend into the expansion chamber and terminate within the expansion chamber.

Furthermore, with many types of compact vehicles such as motorcycles and the like, the actual placement of the valve in relation to the engine, bearing in mind that the exhaust system passes beneath the engine and ground clearance is extremely critical, can make arrangements of the type shown in the aforenoted copending applications less than fully satisfactory.

It is, therefore, a principal object of this invention to provide an improved exhaust control system for an internal combustion engine.

It is a further object of this invention to provide an improved exhaust gas control arrangement that is particularly adapted for exhaust gas tuning and which can be applied to compact vehicles such as motorcycles.

It is yet another object of this invention to provide an improved exhaust gas control arrangement for motorcycles.

In connection with the use of control valves in engine exhaust systems, the heat of the exhaust gases can have serious effects on the operation of the control valve. That is, the substantial temperature differences that can exist in an exhaust system from start up to normal running temperatures can be significant and the operation of the control valve could be adversely affected by such an arrangement.

It is, therefore, a still further object of this invention to provide an improved exhaust gas control arrangement for internal combustion engines wherein the exhaust control valve is maintained at a more uniform temperature.

SUMMARY OF THE INVENTION

A first feature of this invention is adapted to be embodied in a motorcycle having an internal combustion engine having a forwardly facing exhaust port, a rearwardly facing exhaust port and first and second exhaust pipes conveying exhaust gases from respective exhaust ports downwardly and to the rear of the engine. An expansion chamber is positioned beneath and to the rear of the engine and extends transversely of the motorcycle. At least one of the exhaust pipes enters the expansion chamber through one of its sides and extends transversely of the motorcycle to an end terminating within the expansion chamber at a point spaced from the side through which it entered. The other exhaust pipe also terminates within the expansion chamber. Means are provided for discharging the exhaust gases from the expansion chamber to the atmosphere.

Another embodiment of this invention is adapted to be embodied in a motorcycle having an internal combustion engine that has an exhaust port and an exhaust pipe that conveys exhaust gases from the exhaust port downwardly and to the rear of the engine. In accordance with this feature of the invention, the exhaust pipe enters into an expansion chamber that is positioned beneath and to the rear of the engine and which extends transversely of the motorcycle. The portion of the exhaust pipe that extends into the expansion chamber also extends transversely of the motorcycle. A reflective valve arrangement is contained within the expansion chamber.

BRIEF DESCRIPTION OF THE DRAWINGS

FIG. 1 is a side elevational view of a motorcycle having an exhaust system and exhaust control arrangement constructed in accordance with an embodiment of the invention.

FIG. 3 is a cross-sectional view taken along the line 3—3 of FIG. 2.

FIG. 5 is a top plan view, in part similar to FIG. 2, showing another embodiment of the invention.

FIG. 6 is a cross-sectional view taken along the line 6—6 of FIG. 5.

FIG. 7 is an enlarged cross-sectional view taken along the line 7—7 of FIG. 5.

FIG. 8 is a further enlarged cross-sectional view taken along the line 8—8 of FIG. 7.

FIG. 11 is a top plan view, in part similar to FIGS. 2, 5 and 9, with a portion broken away, showing yet another embodiment of the invention.

FIG. 12 is a side elevational view of the embodiment shown in FIG. 11.

FIG. 13 is a partially exploded view showing how the valve body of this embodiment is constructed.

FIG. 18 is a top plan view of an exhaust system constructed in accordance with yet another embodiment of the invention.

FIG. 19 is a side elevational view of the embodiment shown in FIG. 18.

DETAILED DESCRIPTION OF THE PREFERRED EMBODIMENTS

Figure 2:
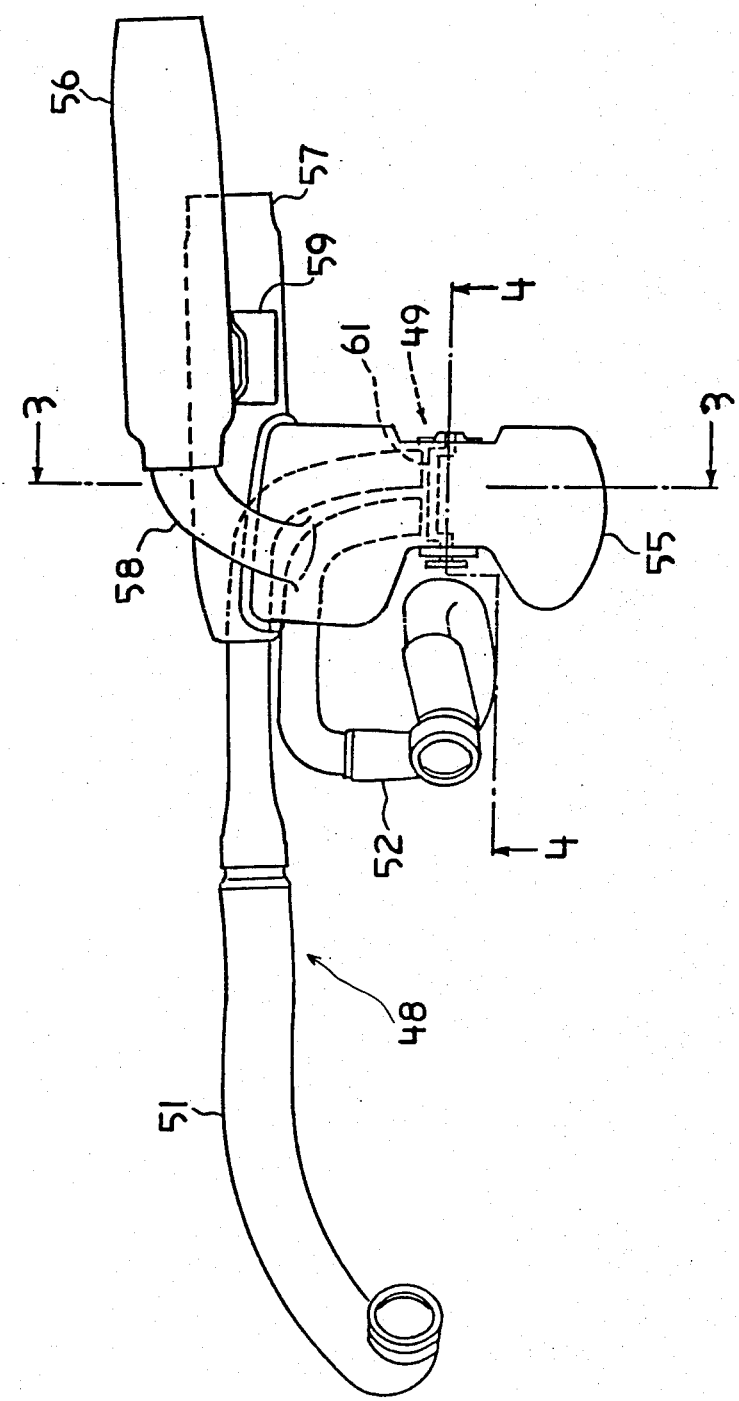
FIG. 2 is an enlarged top plan view of the exhaust system and exhaust control arrangement.

Referring first to FIG. 1, a motorcycle is indicated generally at 31. The motorcycle 31 is depicted as a typical environment in which the invention may be practiced, although it is to be understood that certain facets of the invention may have applicaton with other types of vehicles or with other applications for internal combustion engines.

The motorcycle 31, may generally have a conventional configuration, and is depicted as being comprised of a frame assembly 32 that mounts a front fork assembly 33 for steering movement relative to a head pipe 34. A front wheel 35 is suspended by the front fork assembly 33 in a known manner and is steered by a handlebar arrangement 36.

A fuel tank 37 is carried on the frame assembly 32 rearwardly of the handlebar 36 and a seat 38 is supported to the rear of the fuel tank 37 for accommodating a rider. A driven rear wheel 39 is positioned beneath the seat and is driven by a power unit, indicated generally by the reference numeral 41.

In the illustrated embodiment, the power unit 41 is comprised of a V2, four-cycle, internal combustion engine having a forwardly disposed cylinder bank 42 and a rearwardly disposed cylinder bank 43. The cylinder banks 42 and 43 each have pairs of cylinders. A combined crankcase, transmission assembly 44 is positioned beneath the cylinder banks 42 and 43 and contains the output shaft of the engine which shaft rotates about a generally transversely extending axis. This shaft drives a change speed transmission of a known type. The change speed transmission drives the rear wheel 39 in any suitable manner. Although the invention has particular utility in conjunction with a V2, four-cycle internal combustion engine, certain facets of the invention may be employed with engines having other cylinder numbers or other configurations.

The rear wheel 39 is suspended for suspension movement relative to the frame assembly 32 by means including a trailing arm 45 that is pivoted about a pivot point 46. A combined shock absorber, spring assembly 47 cushions the movement of the rear wheel 39 relative to the frame 32.

As has been noted, the construction of the motorcycle as thus far described may be considered to be conventional and typical of the environment in which the invention may be practiced. The invention resides in the construction of the exhaust system for the engine and this exhaust system is indicated generally by the reference numeral 48 and incorporates an exhaust gas control arrangement, indicated generally by the reference numeral 49.

Figure 4:
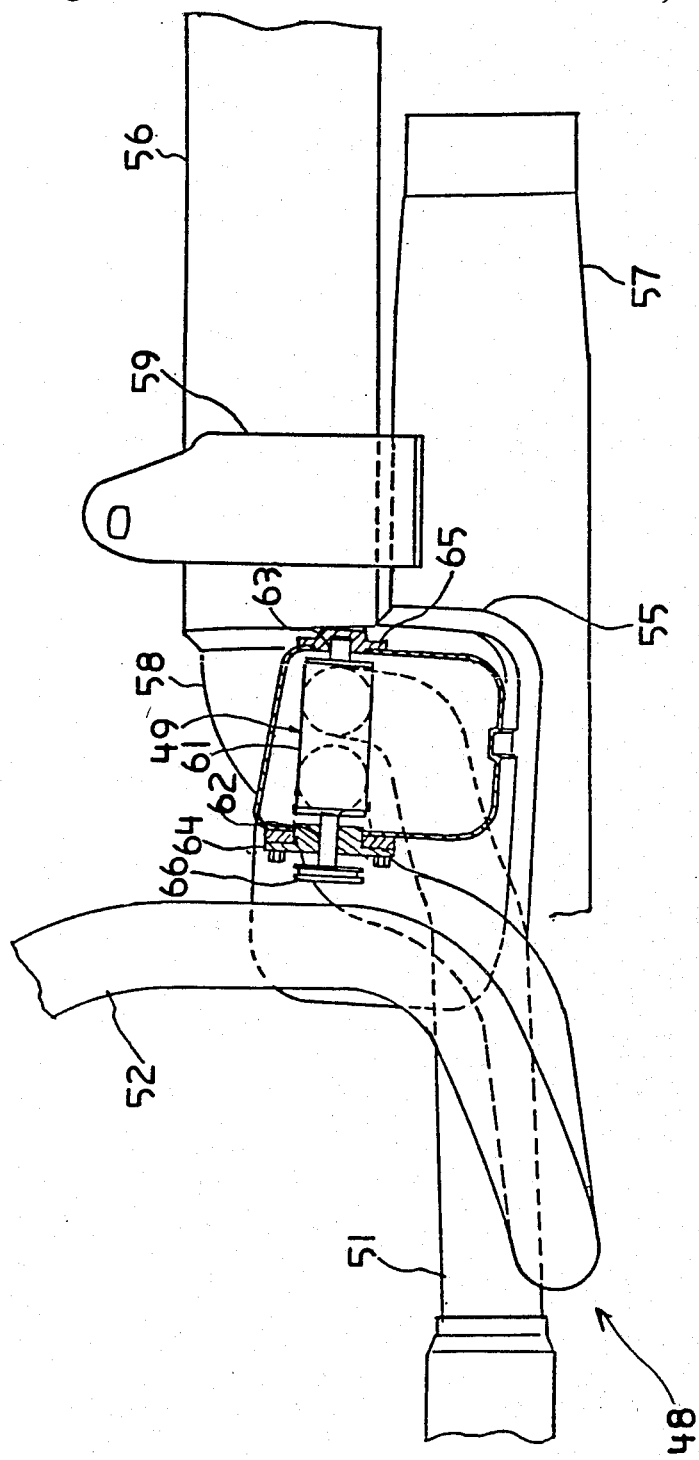
FIG. 4 is an enlarged cross-sectional view taken along the line 4—4 of FIG. 2.

Referring now additionally to FIGS. 2 and 4, the exhaust system 48 is depicted in more detail. It should be noted that the cylinder banks 42 and 43 define, respectively, forward and rearwardly facing exhaust ports (not shown) that also are inclined so as to face downwardly. A first exhaust pipe 51 extends from the exhaust port of the cylinder bank 42 first forwardly and downwardly and then curves rearwardly under the crankcase, transmission assembly 44. A recess may be formed in the underside of the crankcase, transmission assembly 44 so as to clear the trailing portion of the exhaust pipe 51 so as to improve ground clearance.

A second exhaust pipe 52 extends from the exhaust port of the rear cylinder bank 43 in a generally downward direction rearwardly of the engine. The exhaust pipe 52 has its inlet end in communication with the exhaust port of the cylinder bank 23 for receiving the exhaust gases discharged from the combustion chamber of this cylinder bank. It should be noted from the figures that the exhaust pipe 52 has, at its lower end, a reentrantly curved U-shaped section. This section is provided so that the length of the exhaust pipe 52 from its inlet end to its outlet end, to be described, is substantially the same as the length of the exhaust pipe 51 from its inlet end to its outlet end.

The exhaust pipes 51 and 52 all merge into a common expansion chamber 55 that is positioned rearwardly of the crankcase, transmission assembly 44 and generally beneath it. The expansion chamber 55 extends transversely across the width of the motorcycle 31 and thus can have significant volume so as to achieve the desired exhaust gas tuning.

Referring now primarily to FIGS. 2 and 4, it will be seen that the exhaust pipes 51 and 52 extend into the expansion chamber 55 from one side thereof and terminate between its forward and rear side walls at about the transverse middle of the expansion chamber 55. As a result, it is possible to lengthen the exhaust pipes 51 and 52 so as to provide the desired tuning.

The exhaust gases which are delivered from the exhaust pipes 51 and 52 to the expansion chamber 55 are discharged to the atmosphere through a pair of tailpipe, muffler assemblies 56 and 57, which exit from the same side of the expansion chamber 55 through which the exhaust pipes 51 and 52 enter. The tailpipe mufflers 56 and 57 lie on the same side of the rear wheel 39. The exhaust gases are delivered to one end of the tailpipe muffler 56 from the expansion chamber 55 through a short connecting pipe section 58. Exhaust gases are delivered to the tailpipe muffler 57 directly through a side of it that is connected in communication with the expansion chamber 55. The tailpipe mufflers 56 and 57 are joined together and supported by means of a bracket assembly 59 that is suitably fixed to the frame assembly 32.

The combination of the exhaust pipes 51 and 52 and expansion chamber 55 are tuned so as to permit a high power output. As has been noted, however, the fact that the cylinders of the engine fire at different intervals, may cause pulsations in the expansion chamber 55 that are transmitted back through the exhaust pipes to the other cylinder ports which can adversely affect performance under certain running conditions.

The valve assembly 49 is provided so as to preclude such deterioration in low and mid-range performance. The valve assembly 49 includes a valve member 61 that is carried on a pair of stub shafts 62 and 63 which extend generally longitudinally relative to the motorcycle 31. The stub shaft 62 is journaled in a bearing plate 64 that closes an opening in the forward wall of the expansion chamber 55. The stub shaft 63 is journaled in a bearing plate 65 that closes an opening in the rear wall of the expansion chamber 55.

A pulley 66 is affixed to an exposed forward end of the stub shaft 62. The rotational position of the valve member 61, which extends across the ends of the exhaust pipes 51 and 52 as best seen in FIG. 3, is controlled by an electric motor (not shown) which is connected by flexible cables to the pulley 66. The electric motor is, in turn, controlled by a computer that is mapped in response to a sensed engine running condition, such as speed, so as to position the control valve 61 at the desired position to obtain the desired performance in a manner as described in the aforenoted copending patent applications.

In the embodiment of FIGS. 1 through 4, the control valve 49 is positioned approximately at the transverse mid-point of the expansion chamber 55. In some instances, it may be desirable to provide a longer length for the exhaust pipes before their point of entry into the expansion chamber and FIGS. 5 through 8 show such an embodiment. This embodiment differs from the embodiment of FIGS. 1 through 4 only in the location and construction of the control valve and, for that reason, the remaining components have been identified by the same reference numerals and will be described in detail only insofar as is necessary to understand the construction and operation of this embodiment.

Referring now to these figures, it will be noted the exhaust pipes 51 and 52 terminate adjacent one end of the expansion chamber 55. This end of the exhaust pipes 51 and 52 is supposed by means of an L-shaped bracket 71 that forms a part of the control valve assembly, indicated generally by the reference numeral 72. The bracket 71, as may be seen from FIG. 7, does not obstruct the communication of the ends of the expansion chamber 55 with each other.

A control valve element 73 is formed eccentrically on a pair of stub shafts 74 and 75 which are journaled in bearing plates 76 and 77, respectively, that are carried by the bracket 71 and which together with the bracket form a closure for the openings in the wall of the expansion chamber. The stub shaft 74 extends through its bearing plate 76 and carries a pulley 78 at its outer end which is connected to a remote operator as described in conjunction with the embodient of FIGS. 1 through 4.

Figure 9:
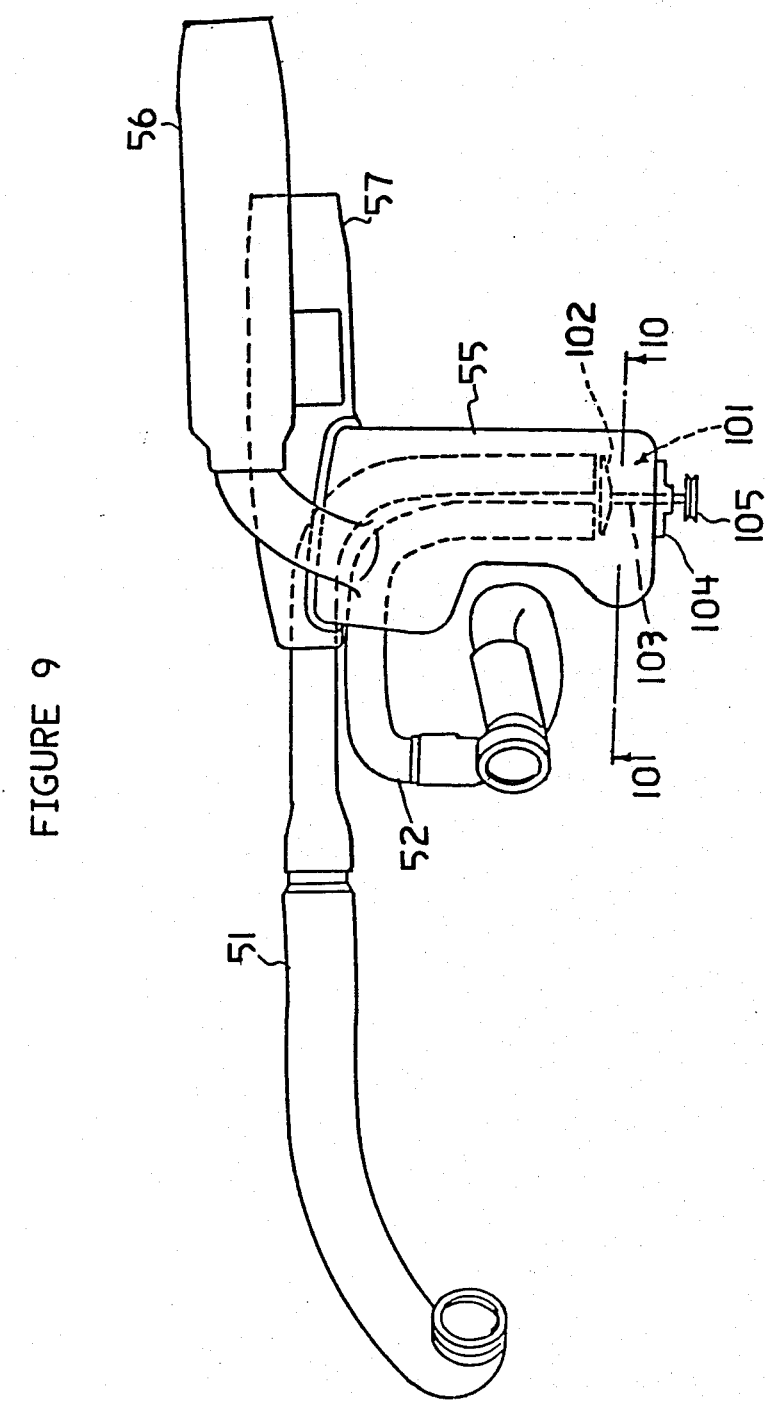
FIG. 9 is a top plan view, in part similar to FIGS. 2 and 5, showing yet another embodiment of the invention.
Figure 10:
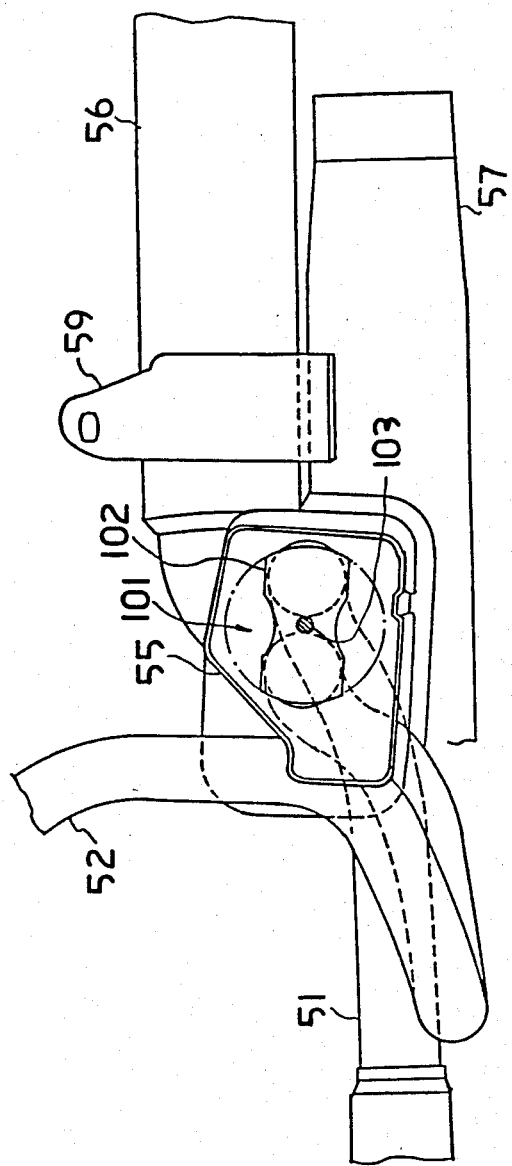
FIG. 10 is an enlarged cross-sectional view taken along the line 10—10 of FIG. 9.

FIGS. 9 and 10 show another embodiment of the invention which is generally similar to the embodiment of FIGS. 5 through 8. This embodiment differs from the previously described embodiment only in incorporating a rotary disk type of control valve rather than a butterfly type of control valve. For that reason, components of this embodiment which are the same as the previously described embodiments have been identified by the same reference numerals and will be described only insofar as is necessary to understand the construction and operation of this embodiment.

Referring specifically to these figures, the control valve is indicated generally by the reference numeral 101 and comprises a generally dumbbell-shaped valve plate 102 that is affixed to a shaft 103. The shaft 103 is journaled in a bearing plate 104 that forms a closure at one side of the expansion chamber 55. A pulley 105 is connected to the shaft 103 for rotating it in the manner as in the previously described embodiments.

The rotational position of the valve member 102 will place it either in confronting relationship with the ends of the exhaust pipes 51 and 52 or clear of them. The amount of obstruction provided by the valve member 102 can be varied to suit engine running characteristics as desired and as described in the aforenoted copending patent applications.

FIGS. 11 through 13 show yet another embodiment of the invention which is generally similar to the embodiments previously described. This embodiment differs from the previously described embodiments in that the ends of the exhaust pipes which enter into the expansion chamber extends somewhat diagonally across it so as to permit the use of a simple butterfly type throttle valve arrangement. Because of the similarity of this embodiment to the previously described embodiments, those components which are the same or substantially the same as the previously described embodiments have been identified by the same reference numerals.

Referring now specifically to these figures, a control valve 151 is positioned in proximity to the outlet ends of the exhaust pipes 51 and 52. It should be noted that in this embodiment, a wall of the expansion chamber 55 is provided with an enlargement 152 that has a pair of semi-circular recesses which cooperate with similar recesses formed in a second piece 153 which, when joined together as shown in FIG. 13, form a single valve body 154. A shaft 155 carries a pair of valve elements 156 which lie within these cylindrical recesses and which shaft has a pulley 157 affixed to its end for rotatably positioning it. It will be noted that in their fully closed positions the valve elements 156 only obstruct approximately one-half of the flow area of the exhaust pipes. This is the fully closed position. In the fully opened position, the valve elements 156 offer substantially no obstruction or reflective area for the exhaust pipes.

Figure 14:
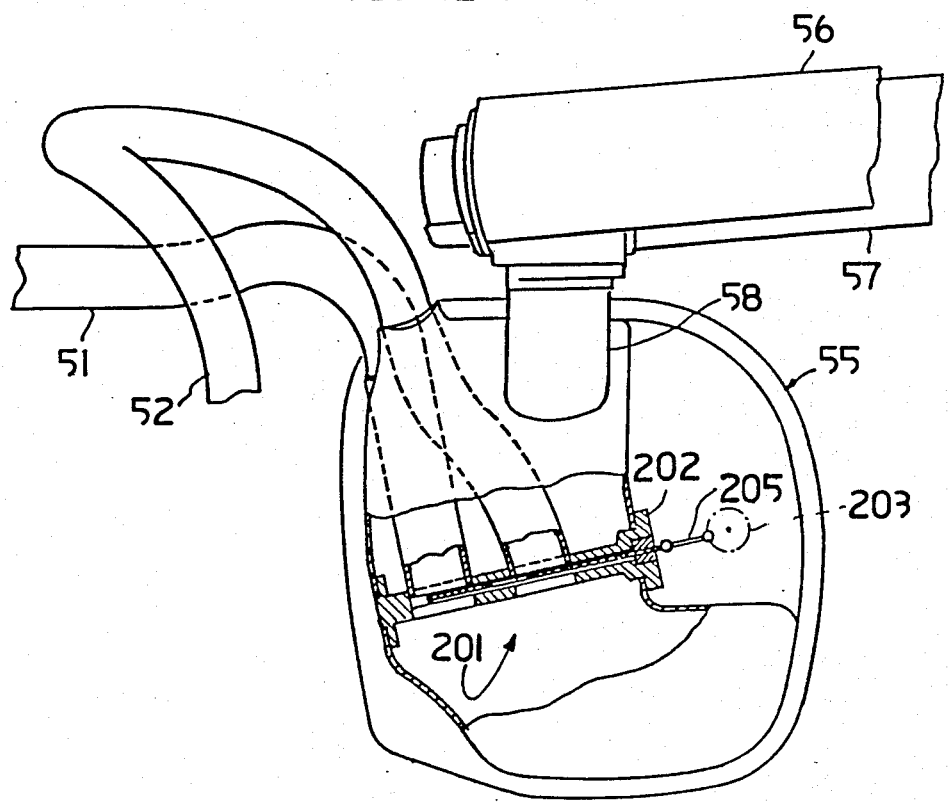
FIG. 14 is a partial view, in part similar to FIG. 11, with a portion broken away and showing yet another embodiment of the invention.
Figure 15:
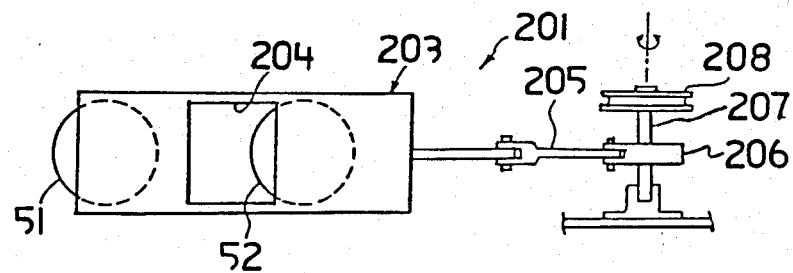
FIG. 15 is an enlarged elevational view showing the valve mechanism of this embodiment.

FIGS. 14 and 15 illustrate another embodiment of the invention which differs from the embodiment of FIGS. 11 through 13 only in the provision of a slide type control valve, indicated generally by the reference numeral 201. The components which are the same or substantially the same as previously described components are identified by the same reference numerals as previously applied.

The ends of the exhaust pipes 51 and 52 within the expansion chamber 55 are supported within a valve plate 202 that defines a slot in which a valve member 203 slides. The valve member 203 is provided with a generally square opening 204 which cooperates with the exhaust pipe 52 in its fully opened position so as to provide no reflective area. The end of the valve plate 203 cooperates with the exhaust pipe 51 so as to provide a variable reflective area for this exhaust pipe end.

A link 205 is pivotally connected to the valve plate 203 at one end and to a crank member 206 at its other end. The crank member 206 is supported on a shaft 207 that is journaled in the expansion chamber and which has an extending end to which a pulley 208 is affixed for effecting rotation of the crank 206 and reciprocation of the valve plate 203 so as to vary the effective reflective area provided at the ends of the exhaust pipes 51 and 52 as with the previously described embodiments.

Figure 16:
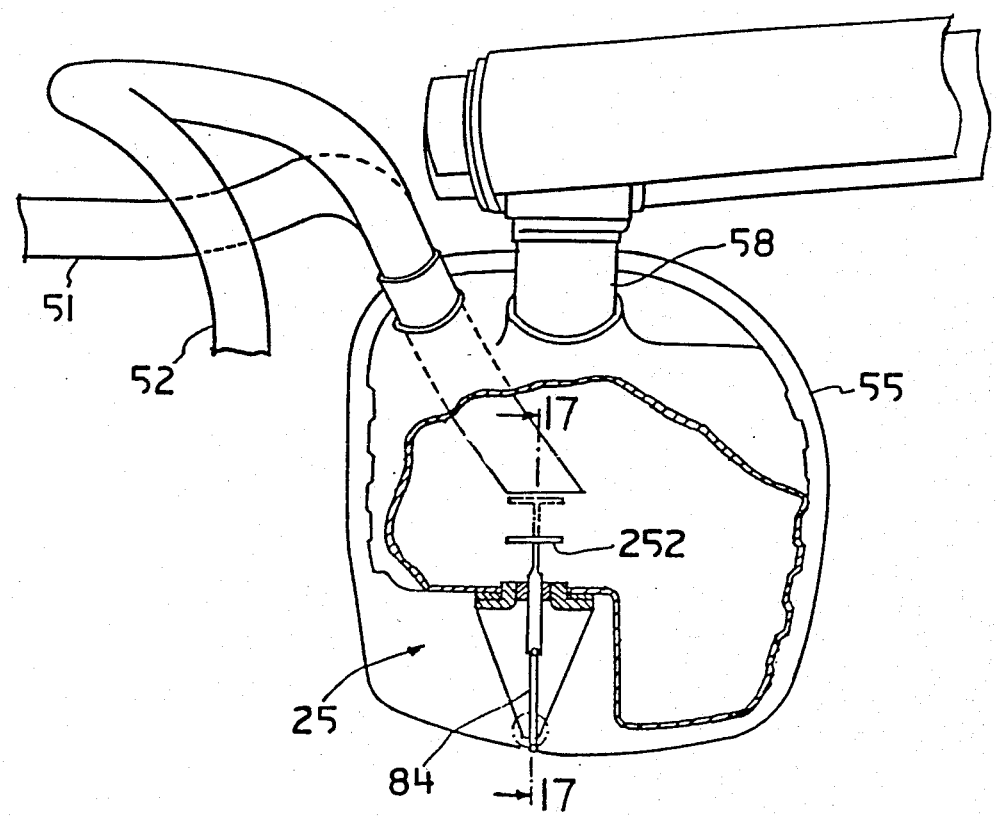
FIG. 16 is a partial top plan view, in part similar to FIGS. 11 and 14, showing yet another embodiment of the invention.
Figure 17:
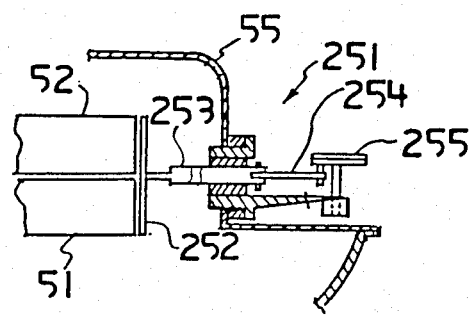
FIG. 17 is a cross-sectional view taken along the line 17—17 of FIG. 16.
Figure 20:
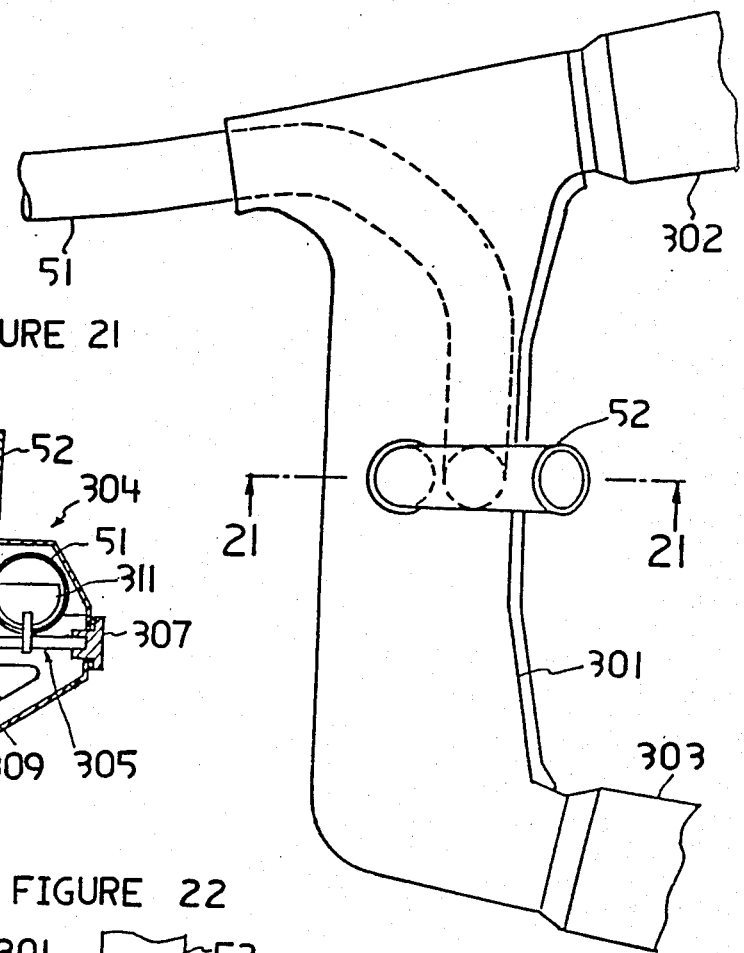
FIG. 20 is a further enlarged top plan view of this embodiment.

FIGS. 16 and 17 depict another embodiment of the invention which is generally similar to the embodiment of FIGS. 14 and 15. However, this embodiment differs from that embodiment in employing a poppet type control valve, indicated generally by the reference numeral 251. The poppet type control valve 251 comprises a valve element 252 that is affixed to a rod 253 that is slidably supported within a side wall of the expansion chamber 55. The valve member 252 is movable between a position in close proximity to the ends of the exhaust pipes 51 and 52 as shown in the broken line view of FIG. 16 and the solid line view of FIG. 17 and a remotely positioned location as shown in the solid line view of FIG. 16.

A link 254 is pivotally connected at one of its ends to the support rod 253 and at its other end to a crank member formed integrally on the pulley 255 for control of the position of the valve member 252 in the manner aforedescribed.

Figure 21:
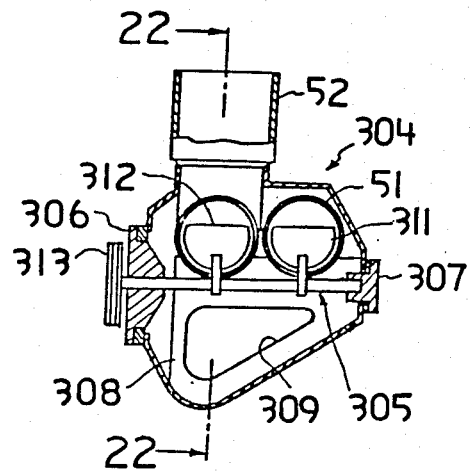
FIG. 21 is a cross-sectional view taken along the line 21—21 of FIG. 20.
Figure 22:
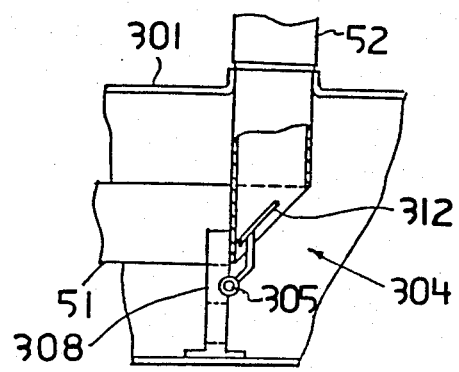
FIG. 22 is a cross-sectional view taken along the line 22—22 of FIG. 21.
Figure 23:
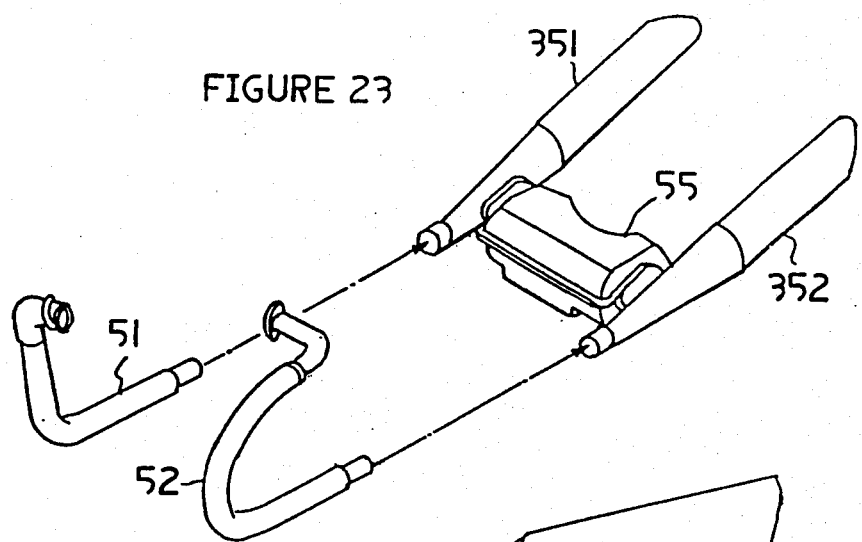
FIG. 23 is a perspective view of an exhaust system constructed in accordance with yet another embodiment of the invention.

FIGS. 18 through 22 show yet another embodiment of the invention which differs in several regards from the previously described embodiments. In this embodiment, an expansion chamber 301 extends transversely across the width of the motorcycle and communicates at its opposite sides directly with the inlet ends of a pair of tailpipe muffler assemblies 302 and 303 which lie on opposite sides of the rear wheel of the motorcyle. The exhaust pipe 51 from the forward cylinder bank enters the expansion chamber 301 through one side and then curves toward its mid-point. The exhaust pipe 52 from the rear cylinder bank enters through the top wall of the expansion chamber 301 and also terminates through its mid-point. The ends of the exhaust pipes 51 and 52 are scarfed at approximately a 45 degree angle and lie adjacent to each other as best shown in FIGS. 21 and 22.

A control valve assembly, indicated generally by the reference numeral 304 is incorporated for controlling the reflective area of the exhaust pipe ends. The control valve 304 includes a control valve shaft 305 that is journaled on opposite walls of the expansion chamber 301 by means of bearing plates 306 and 307. The shaft 305 is also journaled on a bearing plate 308 that is contained internally in the expansion chamber 301 and is affixed, as by welding, to its lower face. The plate 308 is formed with a lightening opening 309 so as to reduce its weight.

A pair of valve elements 311 and 312 are affixed to the shaft 305 and cooperate with the ends of the tailpipes 51 and 52 in the manner as aforedescribed. A pulley 313 is affixed to one exposed end of the valve shaft 305 for controlling its angular position and the effective reflective areas provided to the ends of the exhaust pipes.

Figure 24:
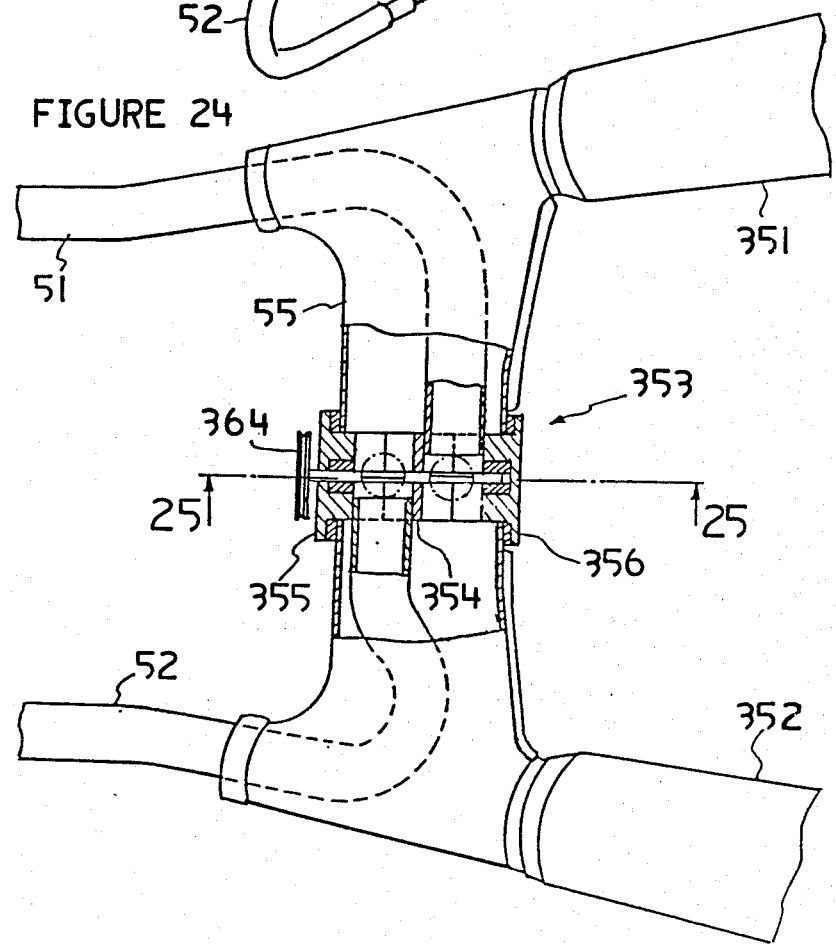
FIG. 24 is an enlarged top plan view of this embodiment, with a portion broken away.
Figure 25:
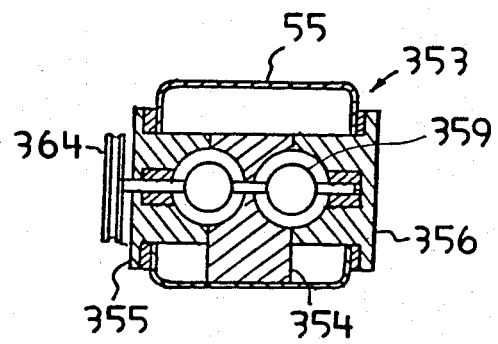
FIG. 25 is a cross-sectional view taken along the line 25—25 of FIG. 24.
Figure 26:
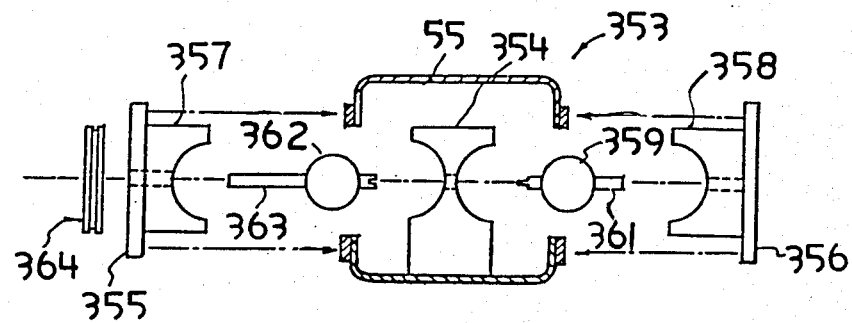
FIG. 26 is a perspective view of the construction shown in FIG. 25 and illustrates how the valve is assembled.

FIGS. 23 through 26 show yet another embodiment of the invention. In this embodiment, the exhaust pipe 51 enters one side of the expansion chamber 55 and curves toward its middle while the exhaust pipe 52 enters the other side and curves toward the middle as best shown in FIG. 24. As a result, the ends of the exhaust pipes 51 and 52 discharge into the expansion chamber in opposite transverse direction. It will be noted that the exhaust pipe 52 is provided with an extra bend so as to increase its length so that the exhaust pipes 51 and 52 will have substantially the same length. Muffler tailpipe assemblies 351 and 352 exit from the opposite sides of the expansion chamber 55 and on opposite sides of the rear wheel like the embodiment of FIGS. 18 through 22.

In this embodiment, a control valve assembly, indicated generally by the reference numeral 353, controls the reflective areas of the ends of the exhaust pipes 51 and 52. This control valve assembly 353 is comprised of a central plate 354 that has a pair of semi-circular recesses formed in its opposite sides. The plate 354 is affixed to the wall of the expansion chamber 55 at its transverse mid-point in an appropriate manner.

A pair of closure plates 355 and 356 extend through openings formed in the opposite sides of the expansion chamber 55 and form closures for openings in these walls. It should be noted that the closure plates 355 and 356 carry members 357 and 358 that have arcuate portions which cooperate with the arcuate portions of the plate 354 when installed so as to define an opening that supports the ends of the exhaust pipes 51 and 52.

A first valve member 359 is affixed to a valve shaft 361 which is journaled in the plate 354 and the plate 356. A second valve member 362 is affixed to a shaft 363 that is journaled in the plates 357 and 354. The shafts 361 and 363 have a tongue and groove connection so that they will rotate in unison. A pulley 364 is affixed to the end of the valve shaft 363 for rotating both of the valve shafts in unison and changing the effective area of them as with the previously described embodiments.

It should be apparent from the foregoing description that a number of embodiments of the invention have been illustrated and described which are effective in providing good performance under all running conditions by varying the reflective areas of the ends of the exhaust pipes. By having the exhaust pipe ends extend into the expansion chamber and positioning the control valve therein, it is possible to provide the desired length and volume ratios for tuning and also will insure that the control valve is maintained at a more uniform temperature. In addition, a more compact assembly is provided which lends itself specifically to application in small compact vehicles such as motorcycles. Although a number of embodiments of the invention have been illustrated and described, it is to be understood that still further changes and modifications may be made without departing from the spirit and scope of the invention, as defined by the appended claims.

I claim:

1. A motorcycle having an internal combustion engine having a pair of oppositely facing exhaust ports and first and second exhaust pipes conveying exhaust gases from respective of said exhaust ports downwardly and to the rear of said engine, an expansion chamber positioned transversely beneath and to the rear of said engine, each of said exhaust pipes extending into said expansion chamber and at least one of said exhaust pipes extending transversely across said expansion chamber from one side thereof and terminating at a place spaced from the other side thereof, and means for discharging exhaust gases from said expansion chamber to the atmosphere.

2. A motorcycle as set forth in claim 1 wherein the means for discharging exhaust gases from the expansion chamber to the atmosphere comprise a pair of tailpipe mufflers.

3. A motorcycle as set forth in claim 2 wherein the tailpipe mufflers exit from the same side of the expansion chamber and lie on the same side of a rear wheel of the motorcycle.

4. A motorcycle as set forth in claim 2 wherein exhaust gases are delivered from the expansion chamber to one of the tailpipe mufflers through an end thereof and exhaust gases are delivered from the expansion chamber to the other of the tailpipe mufflers through a side thereof.

5. A motorcycle as set forth in claim 4 wherein the tailpipe mufflers exit from the same side of the expansion chamber and lie on the same side of a rear wheel of the motorcycle.

6. A motorcycle as set forth in claim 1 wherein the exhaust pipes both enter the expansion chamber through the same side thereof and both of the exhaust pipes extend transversely into the expansion chamber.

7. A motorcycle as set forth in claim 6 wherein the exhaust pipes terminate at the same transverse location within the expansion chamber.

8. A motorcycle as set forth in claim 7 further including reflective valve means disposed contiguous to the ends of the exhaust pipes for changing the effective reflective area thereof.

9. A motorcycle as set forth in claim 8 wherein the reflective valve means comprises a rotary valve.

10. A motorcycle as set forth in claim 9 wherein the valve comprises a single element cooperating with both of the exhaust pipes for varying the effective area thereof.

11. A motorcycle as set forth in claim 10 wherein the valve element is rotatable about an axis that extends perpendicularly to the exhaust pipe ends.

12. A motorcycle as set forth in claim 10 wherein the reflective valve means rotates about an axis that extends parallel to the ends of the exhaust pipes.

13. A motorcycle as set forth in claim 8 wherein the reflective valve means comprises a slide type valve.

14. A motorcycle as set forth in claim 8 wherein the reflective valve means comprises a poppet type valve.

15. A motorcycle as set forth in claim 1 wherein the exhaust pipes enter the expansion chamber through opposite sides thereof and each extend transversely into the expansion chamber from the side through which they enter.

16. A motorcycle as set forth in claim 15 wherein the exhaust pipes end within the expansion chamber at the same transverse location.

17. A motorcycle as set forth in claim 16 further including reflective valve means cooperable with the exhaust pipe ends for changing the effective reflective area thereof.

18. A motorcycle as set forth in claim 17 wherein the reflective valve means comprises a common valve element.

19. A motorcycle as set forth in claim 17 wherein the reflective valve means for the exhaust pipes are supported upon a common rotatable shaft.

20. A motorcycle as set forth in claim 1 wherein the other of the exhaust pipes enters the expansion chamber at a point spaced transversely from the sides thereof.

21. A motorcycle as set forth in claim 20 wherein the exhaust pipe ends terminate adjacent each other within the expansion chamber.

22. A motorcycle as set forth in claim 21 further including reflective valve means cooperating with the ends of the exhaust pipes within the expansion chamber for changing the effective reflective area thereof.

23. A motorcycle having an internal combustion engine having an exhaust port and an exhaust pipe for conveying exhaust gases from said exhaust port downwardly and to the rear of said engine, an expansion chamber positioned beneath and to the rear of said engine and extending transversely of said motorcycle, the portion of said exhaust pipe that extends into said expansion chamber extending transversely relative to the motorcycle and terminating within said expansion chamber, and a reflective valve means contained within said expansion chamber for controlling the effective reflective area of said exhaust pipe.

24. A motorcycle as set forth in claim 23 wherein the reflective valve means comprises a rotary valve.

25. A motorcycle as set forth in claim 24 wherein the rotary valve rotates about an axis that extends perpendicularly to the exhaust pipe end.

26. A motorcycle as set forth in claim 24 wherein the reflective valve means rotates about an axis that extends parallel to the exhaust pipe end.

27. A motorcycle as set forth in claim 24 wherein the rotary valve means comprises a butterfly type valve.

28. A motorcycle as set forth in claim 23 wherein the reflective valve means comprises a poppet type valve.

29. A motorcycle as set forth in claim 23 wherein the reflective valve means comprises a slide type valve.

* * * * *